Apr. 10, 1923.

R. FARIES

PRESSURE GAUGE

Filed Feb. 11, 1910

WITNESSES:

INVENTOR: Robert Faries

By Attorneys,

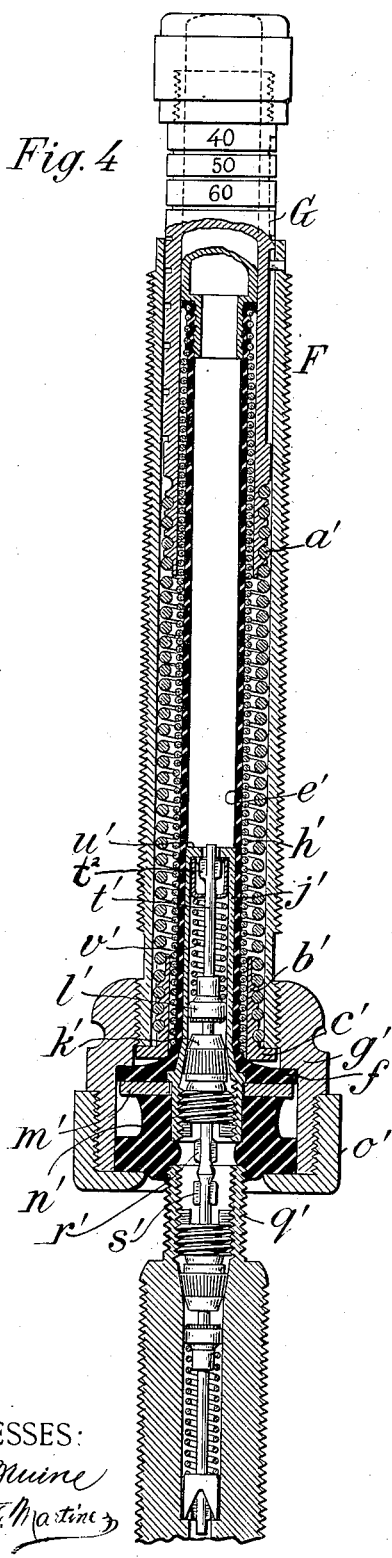
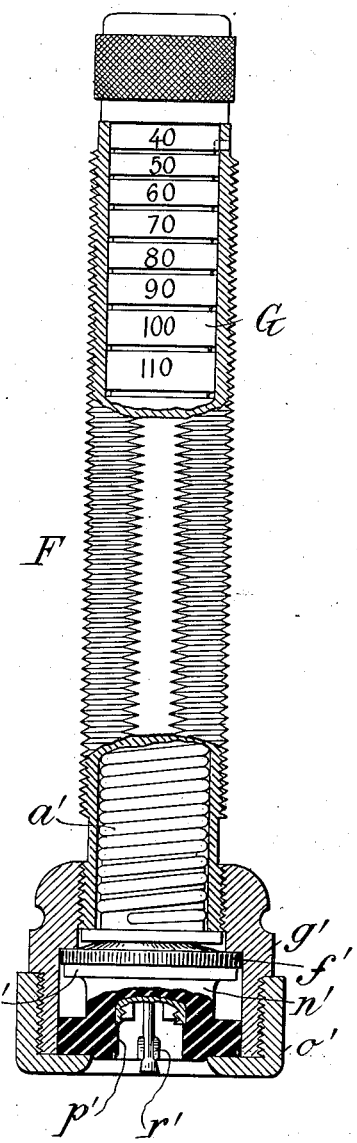

Patented Apr. 10, 1923.

1,451,038

UNITED STATES PATENT OFFICE.

ROBERT FARIES, OF WILLIAMSPORT, PENNSYLVANIA, ASSIGNOR TO A. SCHRADER'S SON, INC., OF NEW YORK, N. Y., A CORPORATION OF NEW YORK.

PRESSURE GAUGE.

Application filed February 11, 1910. Serial No. 543,222.

*To all whom it may concern:*

Be it known that I, ROBERT FARIES, a citizen of the United States, residing in Williamsport, in the county of Lycoming and State of Pennsylvania, have invented certain new and useful Improvements in Pressure Gauges, of which the following is a specification.

This invention relates to pressure gauges and aims to provide a device of this character which is particularly adapted for use in connection with automobile or other tires.

It is especially desirable in the use of pneumatic tires, particularly in connection with automobile or other heavy vehicles, to maintain the air therein at a substantially constant pressure. The degree of pressure, of course, depends upon the character and weight of the vehicle and the construction of the tires. It has heretofore been proposed to provide a gauge which can be applied to the valve of the tire so as to indicate the pressure therein. In ordinary use of an automobile for instance, the wheel is apt to assume a position in which the valve is so located that it is difficult to read the gauge while in position upon the valve. In prior constructions as soon as the gauge is removed, the pressure upon it is relieved and the indicating device assumes its zero position.

According to the present invention a gauge is provided which has a press-on seat for engaging a tire valve casing making a tight joint therewith, a tire valve unseating element adapted to unseat the tire valve upon the application of the gauge to a tire valve casing, and a movable pressure-indicating element for showing the pressures, together with means for retaining the pressure-indicating element in indicating position after the gauge is removed from the tire valve.

In the preferred form of the device the indicating member is in the form of a plunger which moves longitudinally of the device, means being provided for holding the plunger in its various positions. By preference the member which takes the pressure and moves thereunder is connected to the indicating member in such manner that both the pressure member and indicating member are held in their outward positions against the tension of a loading spring whereby when holding means is released, both members return to their normal or zero positions.

In the drawings, wherein are shown two embodiments of the invention,—

Fig. 3 is a diametrical section partly in elevation showing another form of the device.

Fig. 4 is a similar view showing the gauge of Fig. 3 applied to a tire valve.

Figure 1:
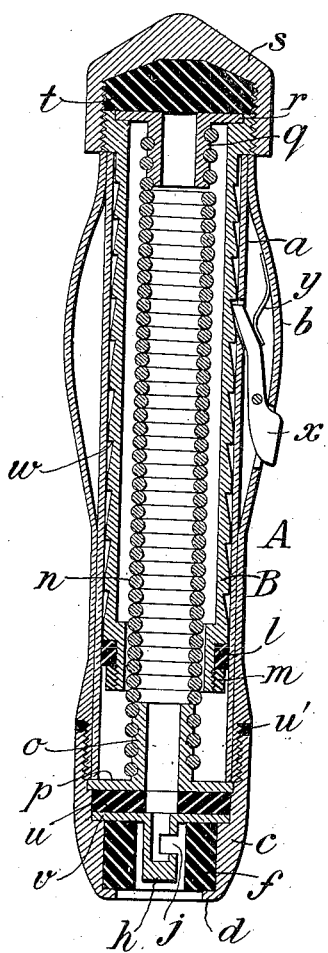
Fig. 1 is a diametrical section of one form of the gauge embodying the invention, the parts being shown in their zero positions.
Figure 2:
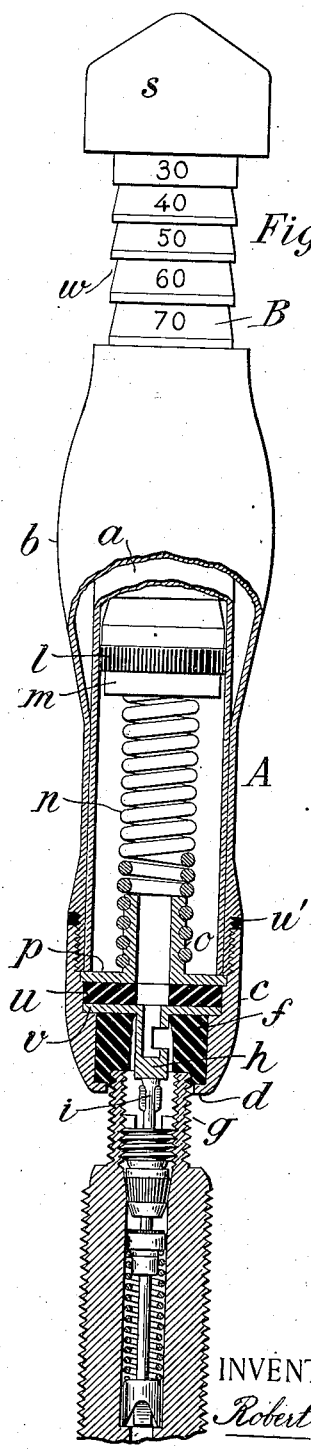
Fig. 2 is an elevation partly in section showing the gauge applied to a tire valve and showing the indicating member in one of its indicating positions.

Referring first to Figs. 1 and 2 of the drawings, let A indicate a suitable casing which as shown preferably comprises an inner shall $a$ and an outer shell $b$, the latter being enlarged at one part to form a suitable handle or grasping portion for the device. The lower end of the shell $b$ is screw-threaded to receive a bottom portion $c$ which is formed with an internal flange $d$ adapted to retain a tubular packing $f$ within it. Such packing is adapted to fit the upper end of the valve shell $g$ (Fig. 2) to make a tight joint when pressed by the user against such shell. The packing $f$ constitutes a press-on seat for the gauge. A tire valve depressor $h$ in this position strikes the deflating pin $i$ of the valve and forces the valve from its seat whereby the air pressure within the tube or other device is permitted to flow through a suitable opening $j$ in the depressor $h$ and upwardly within the casing A. In the latter is mounted to move a pressure-indicating member B which is preferably also a pressure-responsive member, although not necessarily so. The presure-indicating member B is shown as a tubular plunger or sleeve closed at its upper end and open at its lower end, being there provided with a piston packing $l$ held in place by a collar $m$, the function of such packing being to make a tight sliding joint between the lower part of the pressure member B and the inner shell $a$. This sliding action in effect provides an expansible air chamber. Any other means may be adopted whereby a sufficiently tight joint is made to cause a proper movement of the pressure member. In the construction, any suitable pressure-resisting element may be used to load the plunger B and as herein shown the pressure member or plunger B is loaded by a spring $n$, the lower part of which is connected to a thimble $o$ having a flange $p$ which fits under the edge of the inner shell $a$. A similar construction is adopted at the top of the gauge where the spring is connected to the plunger B by a thimble $q$ which has a flange $r$ resting against the upper edge of the plunger.

For convenience of construction a cap $s$ is provided which screws upon the upper end of the plunger, a suitable packing $t$ being provided to make a tight joint between the two, whereby no air can escape through the top of the plunger. At the lower part of the gauge a packing $u$ is provided which rests against the under side of the flange $p$ and on the upper side of a flange $v$ which in the construction shown carries the depressor $h$. As the part $c$ is screwed on to the shell, this packing is compressed and forms a tight joint between the parts. A packing $u'$ may be interposed between the member $c$ and the shell $b$.

In the construction shown in Figs. 1 and 2 the pressure member or plunger B is provided at its outer side with a series of teeth $w$ which are illustrated as extending entirely around the plunger, and preferably serve as indicating divisions, a scale of pressures being marked directly thereon. These teeth $w$ are adapted to be engaged by a catch $x$ pivoted to the outer shell $b$ of the casing, the nose or engaging part of the catch being held against the teeth of the plunger by a suitable spring $y$.

In use when it is desired to ascertain the pressure within the tire or like device the press-on foot of the gauge is pressed over the end of the valve whereupon the depressor opens the tire valve and permits the air to act upon the plunger and move it outwardly to an extent corresponding with the pressure within the tire, the catch $x$ engaging the nearest tooth $w$. The user may then remove the gauge from the valve and ascertain the pressure upon inspection, the plunger being held in its engaging position until released by pressing the catch $x$.

The invention greatly facilitates the ascertaining of tire pressures. Irrespective of the position which the valve assumes when the car is at rest, the gauge can be easily applied to the valve. With the common form of gauge it is extremely difficult to read the pressures in many positions of the gauge, since the valve may assume any one of an infinite number of positions extending around the circle of the wheel. With the present device it is necessary only to hold the gauge against the end of the valve momentarily until the pressure is communicated to the gauge and then remove it, the reading being done at the convenience of the user. After the pressure has been noted the thumb-piece of the catch $x$ may be forced inwardly releasing the plunger so that its spring carries it to its innermost or zero position.

It is to be noted that in the construction just described the spring acts as a means for automatically restoring both the pressure member and the indicating device to their normal positions so that no further adjustments are required than the depression of the catch.

In the construction just described a mechanical means is shown for holding the pressure-indicating plunger in its adjusted position. Other means may be employed for this purpose. One of such means is illustrated in Figs. 3 and 4. In these figures let F indicate a suitable casing within which is mounted to move a pressure-indicating member such as the plunger G. To the inner end of the plunger G is connected the outer end of a spring $a'$, while the inner end of the spring is connected to a thimble $b'$ provided with a flange $c'$ bearing against the inner end of the casing F. To the inner end of a plug contained within the plunger is connected a rubber or other expansible tube $e'$ which is enlarged at its lower end $f'$ and fits against a shoulder formed on the base or bottom section $g'$ of the casing. A small spring $h'$ surrounds the tube $e'$ and is connected to the plug contained within the plunger at one end while its other end is wound tightly around the lower end of the expansible tube $e'$. Within the lower end of such tube is a valve shell $j'$ within which is screwed an ordinary check valve (preferably of the Schrader type) and consisting essentially of a seat $k'$ and valve proper $l'$. This valve need not be described in detail except to say that it is designed to admit air under pressure into the interior of the tube $e'$ and to prevent its escape until it is intentionally opened. Bearing against the enlargement $f'$ of the tube $e'$ is a metal washer $m'$, and bearing against such washer is a packing washer $n'$. A cap $o'$ screwing on the portion $g'$ compresses the packing washer $n'$ against the metal washer $m'$, and this latter presses the enlargement $f'$ against a shoulder on the base or bottom portion $g'$. The enlargement $f'$ is also by this means pressed against the flange $c'$ of thimble $b'$. By this means a tight joint is made between the parts so that air entering through the valve cannot escape except into the tube $e'$. On its lower side the packing $n'$ which constitutes a press-on foot for the gauge is provided with an opening $p'$ designed to fit over the end of a valve shell $q'$ (Fig. 4). When in this position the depressor pin $r'$ of the gauge valve engages with the deflating pin $s'$ on the tire valve, pressing both valves from their seats, and permitting the air within the tire to pass upwardly into the tube $e'$, thus forcing the plunger G upward. When the pressure within the tube $e'$ and the tire are equalized, the gauge is removed, the valve proper $l'$ pressing against its seat and holding the pressure within the tube $e'$ until the indications are read whereupon the pressure within the gauge may be relieved by pressing the depressor pin $r'$ upwardly, thus opening the valve. It is desirable that the valve $l'$ be limited in its movement in order that it may certainly press down the deflating pin $s'$. To this end the valve stem $t'$ has a projection at or near its end, and the tube $j'$ is provided with a shoulder $u'$ against which such projection bears when the valve is opened to a predetermined extent. If desired, the spring $v'$ operating the valve $l'$ may be of greater strength than the corresponding spring of the tire valve so that when the pressures in the gauge and tire are equalized the valve $l'$ will be forced to its seat before the gauge is removed.

Both the springs $a'$ and $h'$ serve to load the gauge. If the spring $h'$ is made sufficiently heavy, the spring $a'$ may be omitted. The part G may be elongated if desired, so as to extend further into the casing F.

It will be observed that in both constructions shown, the pressure-indicating member is in the form of a sleeve which telescopes with the casing; that is to say, it may be projected to varying degrees beyond the end of the casing. In each case the gauge is provided with a spring which enters the sleeve. By such constructions a more compact gauge is obtained.

It will be understood that while several forms of the invention have been shown and described the invention is not limited thereto, as these constructions may be widely varied without departing from the invention. Instead of the pressure member shown, any other suitable pressure member may be provided, and any other suitable indicating device. The catch illustrated may be varied in construction and need not necessarily be hand-operated since any means may be provided for holding the indicating device in its varying indicating positions a sufficient time to permit removal of the gauge from the valve construction by the user.

What I claim is:—

1. A portable pressure gauge for pneumatic tires comprising a press-on seat for engaging a tire valve, a tire valve depressor adapted to unseat the tire valve and permit air from the tire to enter the gauge, means for indicating the pressure, and means for retaining said indicating means in indicating position after the gauge is removed from the tire.

2. A portable pressure gauge for pneumatic tires, comprising means for making a tight joint with a tire valve, a tire valve depressor, means for indicating the pressure, and means for retaining said indicating means in indicating position, said indicating means comprising a hollow pressure responsive part, and a loading spring attached to said pressure responsive part within the hollow indicating means.

3. A portable pressure gauge for pneumatic tires having means for connection with a tire valve adapted to make a tight joint therewith and having means for opening said valve to permit communication of air from the tire to said gauge, and said gauge having a pressure-responsive indicating member sliding therein, said member being hollow, a spring adapted to load said member passing into said member, said member being adapted to be moved by the air pressure while such gauge is in communication with the valve, and means operative in all positions of the gauge for holding said member temporarily in the indicating position after such communication is broken, whereby the indication may be read after the gauge is removed from the tire valve.

4. A portable pressure gauge for pneumatic tires having means for connection with a tire valve, adapted to make a tight joint therewith, and having means for opening said valve to permit communication of air from the tire to said gauge, said gauge comprising slidably connected members, one being an outer case and the other being a hollow plunger movable in said case, means for preventing the passage of air around the plunger, a pull spring within said plunger connected at one end to the plunger and at its other end to the outer case, and means operative in all positions of the gauge for holding said plunger temporarily in an indicating position after such communication is broken, whereby the indication may be read after the gauge is removed from the tire valve.

5. A portable pressure gauge for pneumatic tires having means for connection with a tire valve, adapted to make a tight joint therewith, and having means for opening said valve to permit communication of air from the tire to said gauge, and said gauge comprising an outer case and a hollow indicating member sliding along said case and adapted to be moved by the air pressure while the gauge is in communication with the valve, a pull spring within and adapted to load said indicating member, and means operative in all positions of the gauge for holding said indicating member temporarily in its indicating position after such communication is broken, whereby the indication may be read after the gauge is removed from the tire valve.

6. A pressure gauge comprising two telescopic tubes forming an expansible air chamber, an extension spring within said tubes connected to the respective tubes for normally contracting the tubes, means at one end of one tube for cooperating with the air valve of a pneumatic tire to depress the valve stem and open the valve and admit air to the interior of said tube, the other tube being closed at its end and remote from said valve opening end of the cooperating tube, one of the tubes having graduations for indicating the amount of extension of the tubes and the corresponding air pressure.

7. A tire pressure gauge, comprising slidably connected members, one being an outer case having at one end means for application to a tire nipple to open the valve thereof and the other member being an internal hollow piston open at one end, a pull spring within the hollow piston connected at one end to the closed end of the piston and at its other end to the outer case, one of said members being provided with graduations for indicating the position to which the piston has been moved by the tire pressure, and means whereby the piston may be maintained temporarily in its pressure indicating position after removal of the gauge from the tire nipple.

8. A gauge for ascertaining the air pressure in applied inflated tires comprising a movable pressure indicating element with means for retaining the indicating element in pressure indicating position, a press-on seat for engaging the tire valve casing including a resilient member adapted to form a substantially air tight connection with the valve casing when pressed against it; a fixed presser foot extending therethrough adapted to depress the valve plunger, said presser foot having a passageway formed therein to admit the air to operate the pressure indicating element, and means operable to cause the restoration of said indicating element to zero position.

9. A gauge for ascertaining the air pressure in applied inflated tires, comprising a movable pressure indicating element with means for retaining the element in pressure indicating position, a press-on seat for engaging the tire valve casing; a tire valve unseating element adapted to operate upon the application of the gauge to the tire valve casing, and operating means for causing the movement of the indicating element upon the unseating of the tire valve.

10. A gauge for ascertaining the air pressure in applied inflated tires, comprising a movable pressure indicating element with means for retaining the element in pressure indicating position, a press-on seat for engaging the tire valve casing; a tire valve unseating element adapted to operate upon the application of the gauge to the tire valve casing, and operating means for causing the movement of the indicating element upon the unseating of the tire valve, said retaining means being releasable to reset the indicating element to zero position.

11. A gauge for ascertaining the air pressure in applied inflated tires comprising a movable pressure indicating element with means for retaining the indicating element in pressure-indicating position, a press-on seat for engaging the tire valve casing, including a resilient member adapted to form a substantially air-tight connection with the valve casing when pressed against it, a presser foot extending therethrough adapted to depress the valve plunger, said press-on seat having a passageway formed therein to admit the air to operate the pressure-indicating element, and means operable to cause the restoration of said indicating element to zero position.

12. A pressure gauge comprising two telescoping tubes forming a chamber adapted to contain air, said chamber being adapted to expand as the pressure increases within it, an extension spring connected to both tubes and tending to contract the same, said spring extending within both tubes, means at one end of one tube for co-operating with the air valve of a pneumatic tire to depress the valve stem and open the valve and admit air to the interior of said tube, the other tube being closed at its end remote from said valve opening end of the co-operating tube, one of said tubes having graduations for indicating the amount of extension of the tubes and the corresponding air pressure.

13. A pressure gauge having a portion adapted to make a tight joint with the end of a tire valve or the like, a tire valve depressor, a pressure-responsive means, means forming a normally-closed air passage between said portion and said pressure-responsive means, and including means for automatically trapping the fluid in said gauge to maintain the pressure-responsive means in its actuated position after the gauge is removed from the tire valve.

14. A pressure gauge having a portion adapted to make a tight joint with the end of a tire valve or the like, a tire valve depressor, a pressure-responsive means, means forming a normally-closed air passage between said portion and said pressure-responsive means, and including a valve controlling said passage for automatically trapping the fluid in said gauge to maintain the pressure-responsive means in its indicating position after the gauge is removed from the tire valve.

15. A pressure gauge having a portion adapted to make a tight joint with the end of a tire valve or the like, means for unseating a tire valve in said portion, a reciprocating pressure-responsive means actuated by the air passing through said portion, means forming a normally-closed air passage between said portion and said pressure-responsive means, and including means for automatically trapping the fluid in said gauge to maintain the pressure-responsive means in its indicating position after the gauge is removed from the tire valve.

16. A pressure gauge formed with a pressure chamber adapted to be placed in communication with a receptacle containing fluid pressure, a pressure-responsive means moved by the pressure in said chamber, an inwardly-opening valve for trapping the fluid within the pressure chamber to maintain the pressure therein after the gauge has been removed from the receptacle, and a stem projecting from the valve and adapted to be moved to automatically open the valve when the gauge is applied to the receptacle.

17. A pressure gauge having a portion adapted to make a tight joint with the end of a tire valve or the like, a tire valve depressor, a reciprocating pressure-responsive means, means forming a normally-closed air passage between said portion and said pressure-responsive means, and including an elastic tube connecting said pressure-responsive means with said tire valve portion, and means automatically controlling said passage to trap the fluid in said elastic tube.

18. In a pressure gauge, the combination of telescoping gauge members, an elastic tube connecting the telescoping gauge members and co-operating therewith to provide a pressure chamber, a coiled spring surrounding the elastic tube and also connecting the telescoping gauge members so as to oppose the movements thereof, means forming a normally closed passage through the lower end of said gauge leading to said elastic tube, including means at such end for forming a tight joint with the end of a tire valve, and means also at such end for unseating said tire valve, and means for automatically trapping the air in said pressure chamber to hold one of the gauge members in actuated position after the gauge is removed from the tire.

19. A pressure gauge adapted to be quickly attached to and detached from a tire valve, and having means for making a tight joint with the end of such valve when the gauge is momentarily applied thereto, a tire valve depressor, and said gauge having a pressure-responsive means, means forming a normally-closed air passage between said means for making a tight joint and said pressure-responsive means, and including means for automatically trapping the fluid in said gauge to maintain the pressure-responsive means in its indicating position after the gauge is removed from the tire valve.

20. A pressure gauge adapted to be quickly attached to and detached from a tire valve, and having means for making a tight joint with the end of such valve when the gauge is momentarily applied thereto, and said gauge having a pressure-responsive means, means forming a normally-closed air passage between said means for making a tight joint and said pressure-responsive means, including a valve for automatically trapping the fluid in said gauge to maintain the pressure-responsive means in its indicating position after the gauge is removed from the tire valve, and means for releasing the fluid so trapped.

21. A portable pressure gauge for pneumatic tires and the like, said pressure gauge including telescoping gauge members, one of which is formed with a seat adapted to engage the valve casing of a tire valve, means operably associated with the telescoping gauge members to provide a pressure chamber, yielding means opposing the telescoping action of the gauge members, means for automatically opening the tire valve when the seat is applied to the valve casing of the tire valve, and a check valve for admitting fluid pressure to the pressure chamber and automatically trapping it therein so that a reading can be made after the gauge has been removed from the tire.

22. A pressure gauge for pneumatic tires, comprising a pressure-responsive means, means for temporarily connecting said pressure-responsive means with the interior of a tire through a tire valve, and means for retaining air admitted to said pressure-responsive means from said tire after the connection with said tire is broken, said retaining means having means cooperating with a part of said tire valve for controlling the operation of said tire valve to permit or prevent the passage of air to and from said pressure-responsive means.

23. A pressure gauge having a portion adapted to make a tight joint with the end of a tire valve or the like, a pressure-responsive means, means for forming an air passage between said portion and said pressure-responsive means, a valve for automatically trapping the fluid in said gauge to maintain the pressure-responsive means in its indicating position, and means for unseating said valve when the gauge is applied to the tire valve.

24. A pressure gauge having a portion adapted to make a tight joint with the end of a tire valve or the like, a pressure-responsive means, means forming an air passage between said portion and said pressure-responsive means, a valve for automatically trapping the fluid in said gauge to maintain the pressure-responsive means in its indicating position, means for unseating said valve when the gauge is applied, and a spring for seating said trapping valve, said spring being of greater strength than those usually employed in tire valves, to the tire valve.

25. A pressure gauge having a portion adapted to make a tight joint with the end of a tire valve or the like, a pressure-responsive means, means forming an air passage between said portion and said pressure-responsive means, a valve for automatically trapping the fluid in said gauge to maintain the pressure-responsive means in its indicating position, said valve having a stem adapted to unseat a tire valve and also unseat said trapping valve, when the gauge is applied to the tire valve.

26. A pressure gauge comprising a casing, a portion adapted to make a tight joint with a tire valve or the like, a tire valve depressor, a pressure responsive member, and an indicating sleeve telescoping with said casing.

27. A pressure gauge comprising a casing, a portion adapted to make a tight joint with a tire valve or the like, a tire valve depressor, a pressure responsive member, and an indicating sleeve telescoping with said casing, said pressure responsive member comprising a spring extending into said sleeve.

28. A pressure gauge comprising a casing, a portion adapted to make a tight joint with a tire valve or the like, a tire valve depressor, a pressure responsive member, and an indicating sleeve telescoping with said casing, said sleeve fitting into said casing.

29. A pressure gauge comprising a casing, a portion adapted to make a tight joint with a tire valve or the like, a tire depressor, a pressure responsive member, an indicating sleeve telescoping with said casing, said sleeve fitting into said casing, and said pressure responsive member comprising a spring extending into said sleeve.

30. A pressure gauge comprising a casing, a portion adapted to make a tight joint with a tire valve or the like, a tire valve depressor, and an indicating sleeve telescoping with said casing, said sleeve being adapted to be moved by the pressure, said sleeve being adapted to have the pressure operate against it near its top.

31. A pressure gauge comprising a casing, a portion adapted to make a tight joint with a tire valve or the like, a tire valve depressor, a pressure responsive member, an indicating sleeve telescoping with said casing, and means for retaining said indicating sleeve in indicating position after the gauge is disconnected from the tire.

32. A pressure gauge comprising a casing, a portion adapted to make a tight joint with a tire valve or the like, a tire valve depressor, a pressure responsive member, and an indicating sleeve telescoping with said casing, said pressure responsive member comprising a tension spring extending into said sleeve.

33. A pressure gauge comprising a casing, a portion adapted to make a tight joint with a tire valve or the like, a tire valve depressor, a pressure responsive member, an indicating sleeve telescoping with said casing, said pressure responsive member comprising a spring, and means for retaining the indicator in indicating position after the gauge is disconnected from the tire.

34. A pressure gauge comprising a casing, a portion adapted to make a tight joint with a tire valve or the like, a tire valve depressor, a pressure responsive member, an indicating sleeve telescoping with said casing, said sleeve fitting into said casing, said pressure responsive member comprising a spring extending into said sleeve, and means for retaining the indicator in indicating position after the gauge is disconnected from the tire.

35. A portable pressure gauge for pneumatic tires and the like, said pressure gauge including telescoping gauge members one of which is formed with a seat adapted to engage the valve casing of a tire valve, an elastic tube connecting the gauge members and co-operating therewith to provide a pressure chamber which is in communication with the seat, a coil spring surrounding the elastic tube and connecting the gauge members, means for opening the tire valve when the gauge is applied thereto, and a check valve for admitting fluid pressure to the pressure chamber and automatically trapping it therein so that a reading can be made after the gauge has been removed from the tire.

36. A pressure gauge for pneumatic tires comprising a pressure-responsive means, means for making a contact connection with a tire valve, and means for retaining air admitted to said pressure-responsive means from said tire after the connection with said tire is broken, said retaining means having means cooperating with a part of said tire valve, for controlling the operation thereof to permit or prevent the passage of air to and from said pressure-responsive means.

In witness whereof, I have hereunto signed my name in the presence of two subscribing witnesses.

ROBERT FARIES.

Witnesses:
EUGENE V. MYERS,
FRED WHITE.